Sept. 5, 1961  J. P. RICH  2,998,883
FILTER
Filed Dec. 23, 1957  2 Sheets-Sheet 1
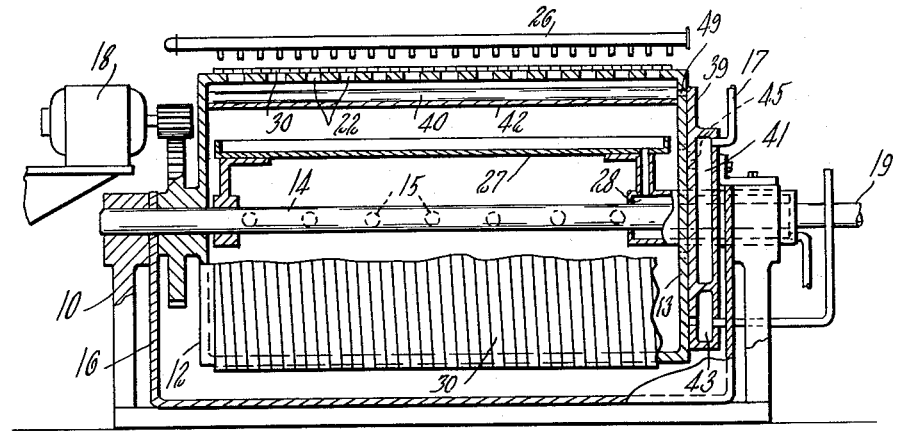
Fig. 1.
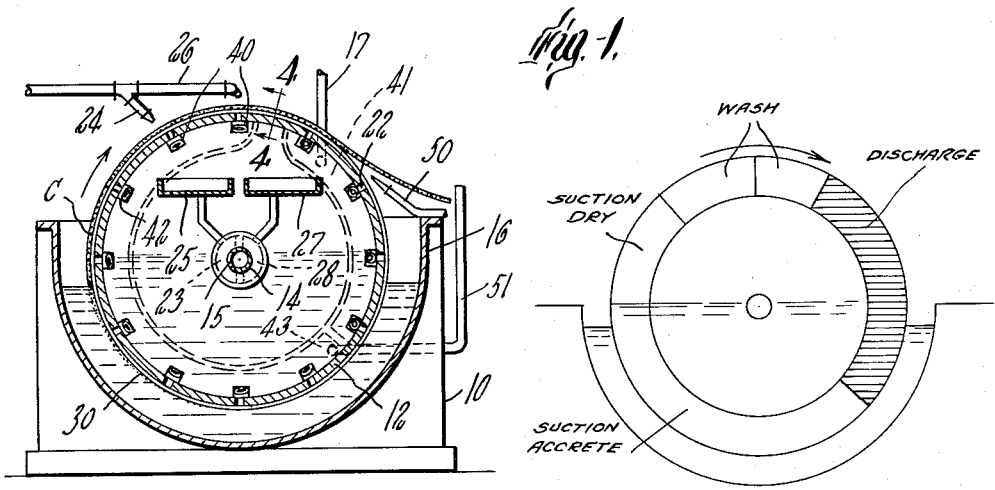
Fig. 2.  Fig. 3.
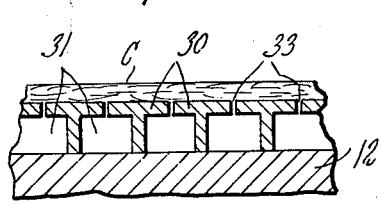 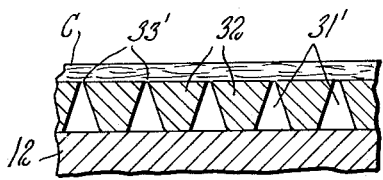
Fig. 4.  Fig. 5.
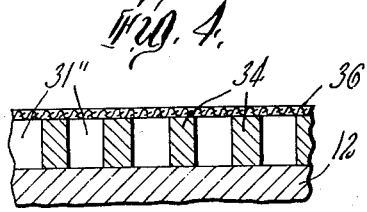
Fig. 6.

Sept. 5, 1961   J. P. RICH   2,998,883
FILTER
Filed Dec. 23, 1957   2 Sheets-Sheet 2
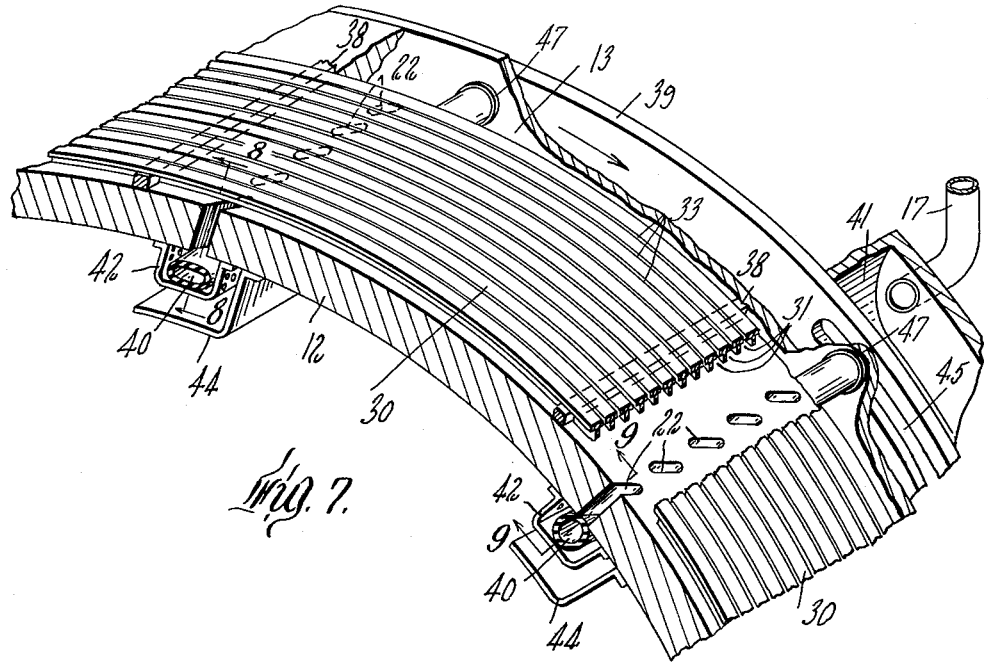
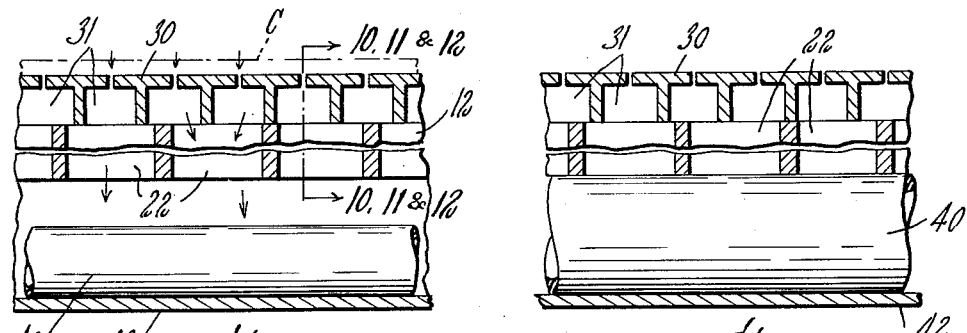
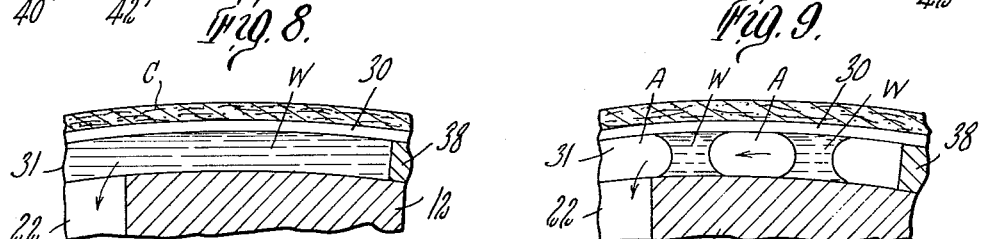
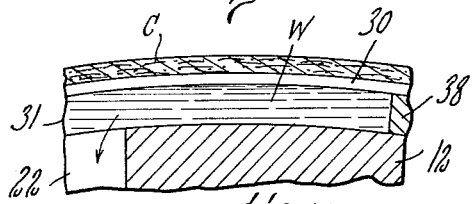
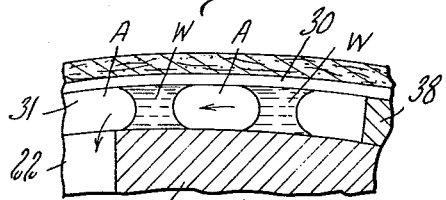
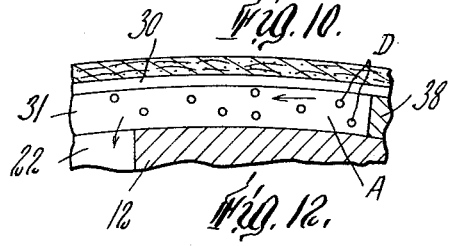

2,998,883
FILTER

John P. Rich, Nashua, N.H., assignor to Improved Machinery Inc., Nashua, N.H., a corporation of Maine
Filed Dec. 23, 1957, Ser. No. 704,775
5 Claims. (Cl. 210—404)

This invention relates to filtration and sheet formation and more particularly to a novel filter structure particularly useful therefor.

In many industrial processes, including the manufacture of wood pulp, a solid material is separated out of a slurry by depositing the solid material on a foraminous filter surface with the liquid passing therethrough. Commonly, practical filters may be in the form of circular flat surfaces, cylindrical surfaces, or even belts with a foraminous outer filter surface, all providing a movable filter support. Such filters operate either by having slurry deposited upon them or by being partially submerged in the slurry containing the solid to be filtered, movement of such a filter serving progressively to accrete the solid product generally by application of suction. The filter cake as deposited on the filter surface frequently is washed one or more times before being discharged as by eliminating the application of reduced, i.e. sub-atmospheric, pressure.

Heretofore, the conventional rotary drum filter or "screen," such as is commonly used in the separation of wood pulp from its filtrate, was of generally cylindrical shape of dimensions up to about 20' long and 14' in diameter and rotated in a slurry contained in a suitable vat. The outer surface of the drum was provided with radially extending ribs about 2 to 8 inches high were mounted on the drum generally axially thereof on about 2 to 5 inch spacing. These ribs in turn supported on their outer edges spaced wires of round or other cross section which were generally wound circumferentially of the drum and supported a screen of suitable mesh forming the filtering surface. The spaces between the ribs were usually connected either centrally or at their ends individually or in groups to a plurality of openings in the drum which communicated with a plurality of longitudinally extending manifolds spaced about the drum. Such manifolds were generally connected to a single port valve so that they were operated as the drum revolved to apply reduced pressure to the filter surface. Other forms of supporting grids having generally similar manifolding arrangements were also used.

In the usual cycle, such arrangement provided for filter cake accretion and filtrate separation for countercurrent flow operation, if desired, the wash water being provided by suitable showers spaced about the drum, as well as the elimination of the suction and/or application of positive pressure for discharge of the filter cake as by a doctor or other suitable means. In a typical cycle of operation of such prior art structure, assuming clockwise rotation of the drum, suction applied to the manifolds connected to the drum surface between its 4 o'clock to 8 o'clock position moved water through the filter surface and so accreted the filter cake. As the manifold moved between its 8 and 10 o'clock positions, the reduced pressure extracted water from the cake and pulled air through the cake to dry it. A shower might be applied to the 10 o'clock position and again the cake was either dried or more showers or press rolls used for washing or thickening from the 10 to 2 o'clock position where atmospheric air might be introduced into the manifold so that the filter cake could be removed from the drum by the usual scraper blade or other devices. The atmospheric air introduced into the just-discharged manifold then had to be removed by the vacuum source before the cycle could begin again.

Such drums had various operating limitations which may be generally grouped in two classifications: First, their inability to achieve rapid and simultaneous enough removal of water and other liquid from all passages adjacent to the filter cake, both to prevent reabsorption or "reblotting" and to achieve the desired separation of wash waters from one another; and second, their relatively inefficient transition through the discharge portion of the cycle wherein a large volume of atmospheric air was successively introduced into the manifold system, which air thereafter had to be removed by a vacuum source.

As to the first of these limitations, with the prior art rotary drum structures as above described, water or other liquid passing through the filter cake had to pass through the covering wire screen into the channels between the ribs, be accelerated as it passed along the channels between the ribs to move it along said channels for distances varying up to about 10 feet to the central or end opening in the drum and thence had to move along manifolds sometimes of differing lengths from the drum opening to the port valve. Not only did much of the water have to be moved axially of the drum for relatively great distances, but the gravity separation of air and water in the channels made such movement relatively slow because the water flowed primarily by gravity. That is, since the air and water were both simultaneously present in the large cross section, generally horizontal passageways, they naturally separated, so that when the reduced pressure was applied to one end of such passageways by the port valve, the air was moved along the surface of the underlying water but without much effect in causing movement of the water along the passageway toward the port valve. This slow water movement was also responsible for causing incomplete separation of wash waters, etc. from one another because of the differences in the distances and hence times required for the flow of water from different, axially spaced, portions of the drum surface to the port valve. Accordingly, although the water from the filter cake on the portion of the filter surface nearest to the port valve might have passed through the port valve prior to the time the drum rotated sufficiently to advance that same portion of the filter surface to the succeeding washing stage, that water from the portion of the filter surface in the same angular position on the drum but located most remote axially from the port valve still had not yet reached the port valve and so would become mixed with the succeeding wash water as the first part thereof began to pass into the port vlave. Naturally, this effect became more serious with longer drum passages and higher speeds and with large drums tended to limit the maximum speed of rotation and hence production as well. Also, since the drum passages were generally horizontal, extending axially of the drum along the filter surface, the drainage, as well as being slow, tended also to be incomplete and so caused reblotting by reabsorption of the undrained liquid into the filter cake itself, particularly when the reduced pressure was released for cake removal. Hence, for these reasons, separation from washing stage to washing stage was incomplete, which decreased the efficiency of the washing operations, particularly when countercurrent flow of wash water was employed. Even more important, removal from the filter cake of liquid before discharge of the cake was by no means as complete as desired.

As to the second of the above-mentioned limitations, it should first be noted that the introduction of air into the manifold and vacuum system of a filter apparatus is desirable only when such air is used as a drying medium to dry the filter cake. However, with the above described prior art structures, at the discharge stage air was always introduced to the manifolds and passages when the cake was discharged from the filter surface. This operation required that the entire manifold and rib passages or spaces of the drum at the discharge portion of the cycle be filled with air at atmospheric pressure, and that enough of such air thereafter be removed promptly to create the desired suction as soon as the discharge stage was passed. With large drums as herein described, since the amount of air introduced per revolution was equal to the total manifold and channel volume less the volume of water contained thereby, volumetric efficiency was necessarily quite low and a high capacity vacuum system was required, even for low drum speeds. Furthermore, such air was useless in the filtering operation per se. At high rotational speeds, the amount of air which had to be removed was tremendous, and hence, as a practical matter, the rate of air removal has heretofore limited the rotational speeds achieved.

In an attempt to solve the above-discussed volumetric efficiency problem of port valve operated rotary drum filters, in addition to the use of structures wherein the manifold size was reduced by moving the valving system closer to the drum periphery, as by using gravity operated valves, so-called shoe type filters have been used. With such filters, a stationary compartment formed by a pair of shoes running close to or in contact with the inner surface of the filter was provided at the discharge section. This compartment was maintained at atmospqheric pressure to enable the cake to be discharged, the remainder of the drum being maintained at reduced pressure for filter cake deposition and drying. Since such structure provided, in effect, a valve at the inner surface of the drum, volumetric efficiency was much improved since only the drum rib passages or the like remained to carry atmospheric air into the vacuum system. Nevertheless, although such shoe type structures operated successfully in laboratory or small industrial sizes, the problems inherent in maintaining the shoes in running relationship with the interior surface of the drum to preserve the necessary seal between the atmospheric pressure and reduced pressure sections have not been solved with large drums of about 20′ in length such as discussed above. Furthermore, due to the necessity of providing sufficiently strong drum structures to resist the large deformation forces created by press rolls and by the pressure difference between the evacuated and atmospheric pressure drum compartments, relatively thick drums with correspondingly long through passages must be used. Accordingly, because of the difficult requirements imposed by drum strength considerations, shoe type filters are not used in large commercial filter structures, the port valve type being predominant.

It is an object of the present invention to provide a novel filter structure effective to reduce to negligible proportions any contained volume, particularly that adjacent the filter surface where it might hold liquid and hence contaminate the succeeding operation either directly or by reblotting or reabsorption into the filter cake. By so doing, greatly improved separation of the liquids resulting from a filtering operation is achieved, particularly when followed by several washing operations. Also, rapid and efficient removal and reapplication of the reduced pressure during filter cake discharge is achieved.

This is accomplished by providing, adjacent the filter surface and between the filter surface and the structure which must operate as a "valve," a structure of filter elements providing relatively minute "capillary" passageways through which a mixture of liquid and air, under the influence of the reduced pressure applied, moves in entrained or mixed condition with slugs of liquid filling the entire cross section of the tube alternating with similar slugs of air or with the liquid in droplet form in a high velocity stream of air. This action is to be contrasted with the prior art structures, wherein the liquid moved primarily simply by gravity flow mostly separately from the influence of the air. The structure of the invention, then, operates in a unique manner so as to cause rapid movement of the liquid from adjacent the filter cake to prevent its mixing or reabsorption therein at a later stage of the operation.

The maximum cross-sectional dimension of such passageways is determined by the same considerations which control the dimensions of capillary passages, that is, the surface tension of the liquid as modified by the passageway shape and its other characteristics, and the applied pressure differential. The minimum dimension necessary to carry away the filtrate from the filter cake upon the first application of reduced pressure may be determined by the usual considerations which control liquid flow. I have further discovered that passageways of entirely suitable size for sufficiently rapid movement of liquid from the filter surface for a practical distance to a "valve" structure are well within dimensions providing "capillary" operation, that is, with a mixture of liquid and air carried as alternating slugs or pistons entirely filling the cross section of the passageway rather than in gravity separated condition. Passageways of such small size, furthermore, have relatively very small total volume and hence make possible better separation and much more rapid and efficient application and reapplication of reduced pressure.

It is a further object of my invention to provide novel valve means for such passageways or groups of passageways, which valve means are capable of rapid operation at the proper time and are positioned at the inner surface termination of the passageways so that manifolding other than the passageways themselves is substantially eliminated.

Various other objects and features of the invention will be apparent from the following description of preferred embodiments thereof, taken with the accompanying drawings, wherein:

FIG. 1 is an overall side elevation, partially broken away, of the rotary drum filter of the invention;

FIG. 2 is a cross-sectional end view of the filter of FIG. 1;

FIG. 3 is an operational diagrammatic end elevation of the filter of FIGS. 1 and 2;

FIG. 4 is an enlarged cross section of the filter elements of the filter of FIGS. 1 and 2;

FIG. 5 is an enlarged view of filter elements of the invention modified from those of FIG. 4;

FIG. 6 is an enlarged view of filter elements of the invention modified from those of FIGS. 4 and 5;

FIG. 7 is an enlarged isometric view of a portion of the drum of FIGS. 1 and 2;

FIGS. 8 and 9 are enlarged cross sections taken on the lines 8—8 and 9—9 of FIG. 7 showing the operation of the valve means of the invention; and FIGS. 10 through 12 are enlarged cross sections showing the operation of the filter elements of the invention.

Referring to the drawings, particularly FIGS. 1, 2, 3 and 7 thereof, a practical rotary drum filter according to the present invention in general includes an enclosed cylindrical drum 12 as a movable filter support, said drum being mounted for rotation about a hollow stationary central shaft 14 positioned in a suitable frame 10. The outer periphery of said drum is partially submerged in a slurry contained in tank 16, and carries thereon, as hereinafter more fully explained, a plurality of filter elements 30, with a plurality of axially extending series of openings 22 in angularly spaced positions providing communication through said drum to the interior thereof from the multiplicity of short passageways 31 formed by said elements 30 and defined as to length by division strips 38.

The cylindrical drum 12 is hollow with sealed ends and its interior is connected through apertures 15 in the hollow central shaft 14 and pipe 19 to a suitable source of reduced pressure so that when said drum is rotated in a clockwise direction (FIGS. 2 and 3) as by motor 18, it will progressively accrete a filter cake C thereon in the usual manner with air and filtrate passing into pipe 19. If desired, successive external showers 24 and 26 may be provided for washing the accreted filter cake and cooperating stationary trays 25 and 27 mounted on shaft 14 within the drum may be provided for collecting the wash waters separately from the filtrate if desired by passing them into the separated halves 23 and 28 of a concentric sleeve about shaft 14 for countercurrent flow of wash water if desired. Suitable means, such as a pneumatic scraper 50, is provided for removing the filter cake from drum 12 and valving it also preferably provided at the openings 22 themselves so that discharge of the filter cake is facilitated without the necessity of maintaining any portion of the drum 12 at atmospheric or higher pressure.

Although several types of valves may be used, and either electrically or hydraulically or mechanically actuated valves are adaptable, a plurality of pneumatically actuated deformable tubes 40 within foraminous members 42 and with baffles 44, as shown in FIGS. 2, 7, 8 and 9 and hereinafter more fully described, are preferred. Such tubes in general extend axially of the interior surface of the drum 12 in spaced positions at each of a series of openings 22 and are deformed to close said openings during the discharge portion of the machine cycle. This is accomplished by expanding such tubes by means of a suitable port valve having a stationary shoe 39 and a high pressure chamber 41 with a port 45 through said shoe effective progressively to connect said tubes 40, as each enters the discharge portion of said cycle, to a source of compressed air supplied through pipe 17 to said chamber. The tubes are deflated after passing beyond said discharge portion as defined by the end of port 45 by a similar port and chamber 43 connected to a source of reduced pressure through pipe 51. With the tubes so deflated filtrate can pass into the interior of drum 12 from tank 16. The pressurized discharge portion of the cycle, and the reduced pressure accrete-dry-wash portion of the cycle are shown in FIG. 3, the double dotted lines of FIG. 2 defining the port valve chambers 41 and 43 which operate the tubes 40 to define the two portions of the cycle.

According to the present invention and as best shown in FIGS. 4 and 7, the filter structure itself is built up directly on the outer surface of the cylindrical drum 12 by helically or circumferentially winding thereon spaced filter element members 30. Such members may, for example, be of T-shaped cross section as shown in FIGS. 4 and 7, or of wedge-shaped cross section as shown in FIG. 5, with the smaller end of such members welded or otherwise attached to the drum to provide therebetween a plurality of peripheral passageways 31 underlying the filter surface and communicating with the filter surface along said passageways at the slots 33 formed by the spaced outer edges of the members. Since it is necessary that the communication at the outer side of the passageways 31 be restrictive in nature, a wire covering 36 may be used, particularly, as shown in FIG. 6, when members 34 of rectangular cross section are to be used. The T and wedge-shaped configuration of FIGS. 4 and 5 provide a restriction by virtue of their greatest cross-sectional dimension being positioned adjacent the filter surface so that relatively narrow slots 33 exist between the filter members. A suitable cylindrical surface on the outer sides of said members is provided by positioning the members radially during the welding operation, or by grinding the outer surface of such members.

Broadly speaking, the filter structure of the invention is useful for many types of filters, with said structure being mounted directly on or forming a part of the drum 12 or other form of movable filter support. Too, it is unique in that its spaced elements 30 provide a multiplicity of underlying passageways such as passageways 31 communicating both with the filter surface through slots 33, for example, and with valve means, such as that shown at 40, through its drum openings 22, so that the filter surface includes a multiplicity of parallel slots, either open or wire covered, extending along underlying passageways. The passageways themselves extend either axially or preferably peripherally of the cylindrical drum and are provided with valve means such as above described for cutting off the passageways from a source of reduced pressure in the drum or other structure for filter cake discharge.

In accordance with the principles of the present invention, such passageways throughout a substantial proportion of their length, particularly adjacent the filter surface, are of "capillary" cross section dimension. This provides, in one situation with liquid-air mixtures, in response to suction applied at the valve means, alternating slugs of liquid and air filling the entire passageway cross section to move said liquid, as by an "air piston" effect, from the filter surface. In the other situation it provides the carrying of the liquid in droplet form in a high velocity air stream. In either situation, the action occurs substantially without gravity flow of liquid. However, due to the increased resistance to fluid flow in passageways of "capillary" dimensions, the effective length of such passageways, that is, the maximum distance to the nearest valve openings, must be relatively short. In general, since it is the liquid rather than the air component which has the greater flow resistance, the initial fluid flow requirements for accretion of a filter cake in the time available, as determined by porosity of filter cake, the concentration of the slurry, fluid viscosity, etc. in general establish the maximum length of the "capillary" passageways. Under certain conditions, however, the situation which exists after accretion and partial extraction of the filter cake, wherein both air and water are being drawn through the cake determines the length of the "capillary" passageways. Under the latter conditions, it is important that sufficient suction be present at the most remote end of the passageway to ensure that water extraction continue while air is flowing through the filter cake at the end of the passageway nearest the valve openings.

As a practical matter, maximum passageway length appears to be of the order of about a foot or so with passageways of suitably small cross-sectional areas to ensure "capillary" flow of a generally intimate mixture of air and liquid either with alternating slugs of air and liquid or with air carried droplets rather than gravity flow of the liquid.

With such short passageways, wherein valve openings must be present at least at about two foot intervals along each passageway, the use, with large cylindrical drum filter structures, of passageways extending peripherally around the drum provides a real advantage, not only because a simplified valve structure may thereby be provided, but because of the increased filtering efficiency possible thereby. This is because, with peripherally extending passageways, there exists no axially extending passageway or other manifolding whatsoever which might tend to decrease speed of liquid movement. Furthermore, when using axially extending partitions or division strips between each series of openings 22, such as shown at 38, to define drum sectors, such strips may be positioned close to the axially extending series of drum openings 22 at the side thereof away from the direction of drum rotation and opposite to that side toward which the filtrate drains by gravity from the multiplicity of passageways 31 of a particular sector. By so doing, not only does gravity flow become available for starting up the filter, but thereafter all drainage from a slot occurs through a single opening 22. This arrangement, then, provides a unique result in a cylindrical drum filter in that it causes accretion and extraction to take place uniformly across the entire length of the drum within a sector, since with the filtrate being simultaneously removed through a series of openings 22 at the trailing ends of all of the peripherally extending passageways of a sector thereof as soon as said sector begins to emerge from the slurry, the filter cake at the leading ends of the passageways of the sector also tends to be extracted first. Thus, air flow will begin at the far end of the passageways as they emerge from the slurry and consequently will sweep by air piston effect the full length of the passageways. These considerations are especially important in large drums as an aid in improving drainage and in reducing the time necessary for movement of liquid away from the region adjacent the filter surface both to reduce reabsorption of such liquid by the filter cake and to prevent undesirable cross mixing.

More specifically as to the details of the preferred structure herein shown, the edges of the members 30 or 32 are spaced from one another to define slots 33 for a distance that will be determined by the minimum size of filter cake particle, for most wood pulp filter cakes, such spacing being about 0.002–0.010″. The width of the members between the thusly formed slots 33 is less critical and is somewhat dependent upon the nature of the filter cake, but should for uniformity of the filter cake be reasonably small, say about 0.05–0.5 inch for most wood pulp filter cakes. By mounting the T or wedge-shaped members directly (FIGS. 4 and 5) on the drum 12, a passageway 31 of larger size than the width of the restrictive slot 33 will be provided behind each slot extending therealong, the cross-sectional dimension of the passageway being defined by the outer drum surface and the sides of a pair of members. With square members 34, the screen 36 will define the outer side of the passageways (FIG. 6). In some cases, clogging makes it desirable to use a wire screen even when slots are used, and in this latter situation, slot size is not so critical since the screen wire then provides the restriction. Nevertheless, proper passageway cross-sectional size must be maintained as herein discussed in some detail. As explained above, in order that the so-formed passageways be of sufficiently small size to cause entrained flow of slugs of water and air therethrough, while at the same time being sufficiently large to carry the initial flow of water, the shape and nature of the passageways as modified by the restriction caused by the slot 33 and wire screen 36 must be considered, as must the surface tension of the liquid and the degree of vacuum applied. Thus, for use in filtering wood pulp, passageways of a cross-sectional dimension of about 0.10–0.15 times 0.05–0.10″ or 0.005 to 0.015 square inch will be found useful.

Although the filter element member may extend axially of the drum to provide a plurality of axially extending slots and passageways, and such might even have certain advantages as to slot washing, it is preferred that the slots 33 extend generally circumferentially of the drum. With such arrangement, as best shown in FIG. 7, each of the series of openings 22 communicating through the drum to a valve means will extend generally axially across the entire length of the drum 12, with the openings 22 themselves of each of said series being of relatively short length and cross-sectional dimensions and preferably staggered and arranged at an angle to the drum axis for drum strength while still communicating with each of said passageways. The division strips 38 are provided in the passageways 31 between each series of openings 22 as explained above to block or otherwise prevent continuous communication outside of the drum surface along the passageways and define sectors extending axially of the drum between succeeding division strips 38, with each sector being drained by a single series of openings 22, as may be seen in FIG. 7 wherein an axial portion of one such sector is shown between division strips 38. Preferably, too, as explained above and as may best be seen in FIG. 7, each series of openings 22 is arranged close to a division strip 38 on the side thereof forming the trailing ends of the axially extending sector of peripherally extending passageways 31, with the maximum passageway length of such a sector being defined by the distance from said openings 22 to the next succeeding division strip 38. Thus, since such maximum passageway length apparently should not exceed about a foot for best operation, the groups of openings 22 are best spaced from one another a peripheral distance of about a foot or slightly greater uniformly about the periphery of the drum. With large drums in particular, then the so-formed sectors are quite numerous, and of relatively small angular extent which is of substantial help both in providing uniformity of the accreted filter cake as well as its treatment and in reducing mixing of wash filtrates.

Under some circumstances, however, it is contemplated that division strips may not be necessary, and that communication between adjacent series of openings 22 may be controlled by the resistance of the fluid passing along the restricted passageway. Thus, since resistance to flow of a fluid increases as an exponential function of its rate of movement, water at high enough velocities will effectively operate as a seal between the suction portion of the cycle and the discharge portion, at least in high speed drums. This makes possible the use of the rotary filter of my invention as a high speed paper machine without division strips to cause marking of the paper. With low speed machines, which do not tend to carry water to provide sufficient sealing, division strips are probably necessary.

As pointed out generally above, the invention also provides a novel valve structure, which, although particularly useful with the preferred rotary drum filter described herein, is readily adaptable to other types of filters having linearly extending openings or series thereof. As best shown in FIGS. 1, 2, 7, 8 and 9, such valve structure operates to close each of the generally axially extending series of openings 22 at the proper time in the filtering cycle, and to maintain them closed during discharge of the filter cake. Specifically, such valve means comprises a number of deformable axially extending tubes 40 adjacent the inner drum surface, one at each of said series of openings 22, and each with an end thereof suitably mounted on an end wall 13 of drum 12 by fittings 47 providing communication through openings 49 in said end wall. A stationary shoe 39 is provided adjacent said end wall closely spaced therefrom, said wall having a pressure port 45 therein communicating with a pressure chamber 41 for expanding said tubes 40 during the discharge portion of the cycle (FIGS. 8 and 9). A vacuum chamber 43 arranged similarly to pressure chamber 41 is also provided for deflating each tube 40 after it leaves pressure port 45 and maintaining it in deflated condition for the remainder of the cycle. The tubes 40 may each be supported in position as by perforated U-shaped members 42 with their edges mounted on the inner surface of the drum 12 and spanning each axially extending series of the openings 22. If desired, a baffle 44 may be provided for each said series of openings 22 leading from the drum 12 on the side of said series of openings towards its direction of rotation and bent backwards beyond openings 22. Such baffle provides a degree of suction by virtue of the rotation of the filter to create a suction producing water column as the closed end of the baffle moves upwardly through the surface of the filtrate. The maximum length of such column is, of course, limited by the peripheral length of the backward bent portion of the baffle. Nevertheless, the degree of suction created is sufficient to aid filter operation, particularly when starting up.

The medium introduced through pipe 17 to chamber 41 is preferably air under pressure and through pipe 19 to chamber 43 air at reduced pressure, although other fluids, either gas or liquid, will do, and, if desired, means may be provided to aid in starting up by shifting shoe 39. Thus, if only such tubes 40 as are submerged are initially deflated, a filter cake C may be built up on the filter surface. This function may be accomplished either manually or automatically by a simple shift in valve actuation by any suitable means, not shown, or by the use of an auxiliary port valve effective to expand those tubes 40 in the suction dry and the wash portions of the machine cycle (FIG. 3).

With the above described valve means, in which a relatively large number of tubes 40 are mounted directly adjacent the drum 12 so that the liquid moves directly from the passageways 31 or other channels simultaneously across the entire length of the drum from the sector served by a single tube, and past such single tube 40 into the interior of the drum, the usual mixing problems caused by the necessity of moving the liquid from the filter cake over paths of different lengths is much reduced. Hence, stationary trays, such as are shown in FIGS. 1 and 2 at 25 and 27 may be employed for collecting the various wash waters simply by positioning them beneath the area of travel of a tube 40 and its associated series of openings 22 after passing a shower. The rapid extraction of water and its direct movement into such a tray, made possible by the use of relatively short capillary passageways 31 underlying the filter surfaces and connecting them to the tube valve 40, achieves almost complete water extraction before a succeeding shower 26 and its cooperating tray 27 is reached.

As another feature of the preferred structure of the invention, the peripheral configuration of the slots and passageways formed by the circumferentially extending filter surface members makes possible the practical utilization of an air jet means 50 at the discharge position of the filter cake, particularly of wood pulp, to pick it off the drum as a continuous sheet. Thus, by directing an air jet toward the filter surface across the entire length thereof, air will be caused to move along the passageways and hence build up a small amount of pressure which will be communicated to the under side of the filter cake through the slots to lift it out of contact with the drum surface for removal. With a machine employing division strips, the strips will serve to prevent communication of such stripping air with the interior of the drum along the slots, while with a machine without division strips, the presence of slugs of water in the passageways may be utilized to serve the same purpose as above described.

Although the operation of the preferred structure of the invention has been set forth in some detail above, at least as to its various components, its general operation, as shown diagrammatically in FIG. 3, is to accrete wood pulp as a filter cake C upon its filter surface by action of the reduced pressure on the interior of the drum 12, tubes 40 being deflated (FIG. 8) so that free communication is provided between the filter surface and the interior of the drum 12. While the sector of the filter surface remains beneath the level of the slurry in tank 16, the filter cake C accretes rapidly, with water W moving along passageways 31, filling them completely (FIG. 10). After the sector made up of the series of short passageways 31 communicating with a specific series of openings 22 passes above the surface of the slurry in tank 16, the remainder of the water is extracted, with alternating "slugs" or "pistons" of water W and air A filling the entire cross-sectional area of the passageways 31 (FIG. 11) and so provide rapid water removal, the latter stages of water removal taking place with water droplets D carried in a high velocity stream of air A (FIG. 12). Thereafter, the extraction process is repeated at each wash stage with the filtrate therefrom passing into the stationary pans or trays, and finally, tubes 40 being expanded to close openings 22 (FIG. 9), the filter cake C or pulp sheet is lifted from the filter surface by the air knife 50. Tubes 40 then once more pass below the level of the slurry and are deflated by chamber 43 to begin the cycle again.

Thus it will be seen that the invention, in addition to providing a novel rotary drum filter structure, provides a novel filter medium as well as a novel valve means each separately useful in a variety of filters. It is contemplated that the apparatus of the invention may not only be used as a chemical filter such as a so-called "screen," but also may be used as a paper machine of the cylinder type, or for similar uses. Various other modifications within the spirit of the invention and the scope of the appended claims will occur to those skilled in the art.

I claim:

1. A rotary drum filter including a rotatably mounted cylindrical drum having openings communicating therethrough, said openings being arranged in a plurality of axially extending series with one of said series in each of a plurality of angularly spaced positions around said drum, valve means positioned adjacent the inner end of each of said series of openings, means for applying a sub-atmospheric pressure to said openings through said valve means, means supported on the outer periphery of said drum defining a filter surface spaced outwardly from said drum periphery, said last-mentioned means providing a multiplicity of relatively short peripherally extending passageways of capillary dimensions between said drum and said filter surface communicating with said filter surface along substantially their entire length and connected to and communicating with at least one of said series of openings, whereby sub-atmospheric pressure is applied at the portion of said passageways most remote from a connected series of openings, and means for operating said valve means selectively to open and close said valve means directly to connect and disconnect respectively said series of openings and connected passageways and filter surface to and from said means for applying a sub-atmospheric pressure respectively to collect on and discharge from said filter surface a material to be filtered.

2. A rotary drum filter as claimed in claim 1 wherein said capillary passageways are of a cross-sectional dimension of about 0.10–0.15 times 0.05–0.10 inch and of a length of less than about a foot.

3. A rotary drum filter as claimed in claim 1 wherein said valve means includes an axially extending inflatable tube means positioned within said drum adjacent the inner end of said axially extending series of openings, and wherein each said valve means includes means for inflating selectively said tube means to close its said series of openings and for deflating said tube means to open said series of openings.

4. A rotary drum filter including a rotatably mounted cylindrical drum having openings communicating therethrough, said openings being arranged in a plurality of axially extending series with one of said series in each of a plurality of angularly spaced positions around said drum, inflatable tube valve means positioned adjacent the inner end of each of said series of openings, means for applying a sub-atmospheric pressure to said openings through said valve means, means supported on the outer periphery of said drum defining a filter surface spaced outwardly from said drum periphery, said last-mentioned means providing a multiplicity of relatively short peripherally extending passageways of capillary dimensions between said drum and said filter surface communicating with said filter surface along substantially their entire length and having partition means axially extending between said series of openings with successive partition means defining a drum sector connected to and communicating with at least one of said series of openings, whereby sub-atmospheric pressure is applied at the portion of said passageways most remote from a connected series of openings, and means for selectively inflating said tube valve means to inflate and deflate said tube valve means directly to connect and disconnect respectively said series of openings and connected passageways and filter surface to and from said means for applying a sub-atmospheric pressure respectively to collect on and discharge from said filter surface a material to be filtered.

5. A rotary drum filter as claimed in claim 4 wherein said partition means are axially-extending between each said series of openings adjacent the passageway ends away from the direction of movement of the drum surface upon emergence of one of said series of openings from the surface of a mixture upon rotation of said drum, with successive partition means defining a drum sector communicating with one only of said series of openings.

References Cited in the file of this patent

UNITED STATES PATENTS

| | | |
|---|---|---|
| 1,064,702 | Breakell | June 17, 1913 |
| 1,590,401 | Wright | June 29, 1926 |
| 1,892,306 | Hillier | Dec. 27, 1932 |
| 1,930,128 | Lund | Oct. 10, 1933 |
| 2,052,156 | Young | Aug. 25, 1936 |
| 2,068,511 | Raisch | Jan. 19, 1937 |
| 2,161,127 | Bowman | June 6, 1939 |
| 2,167,159 | Oliver | July 25, 1939 |
| 2,395,098 | Butler | Feb. 19, 1946 |
| 2,557,440 | Komline | June 19, 1951 |
| 2,576,288 | Fink | Nov. 27, 1951 |
| 2,803,172 | Trotman | Aug. 20, 1957 |

OTHER REFERENCES

F 12814 IVc/12d, Germany, Dec. 15, 1955.